US012224137B2

(12) United States Patent
Darles et al.

(10) Patent No.: US 12,224,137 B2
(45) Date of Patent: Feb. 11, 2025

(54) ELECTRIC ARC-BLAST NOZZLE WITH IMPROVED MECHANICAL STRENGTH AND A CIRCUIT BREAKER INCLUDING SUCH A NOZZLE

(71) Applicant: General Electric Technology GmbH, Baden (CH)

(72) Inventors: Ludovic Darles, Rillieux la Pape (FR); Jérôme Laurent, Saint Denis lés bourg (FR); Cyril Gregoire, Lozanne (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 169 days.

(21) Appl. No.: 18/058,097

(22) Filed: Nov. 22, 2022

(65) Prior Publication Data

US 2023/0162932 A1 May 25, 2023

(30) Foreign Application Priority Data

Nov. 24, 2021 (EP) .................................... 21210316

(51) Int. Cl.
*H01H 33/91* (2006.01)
*H01H 33/70* (2006.01)

(52) U.S. Cl.
CPC ........ *H01H 33/91* (2013.01); *H01H 33/7023* (2013.01)

(58) Field of Classification Search
CPC ........... H01H 33/7023; H01H 33/7076; H01H 33/78; H01H 33/08; H01H 33/91; H01H 33/7069; H01H 33/703; H01H 2033/566
(Continued)

(56) References Cited

U.S. PATENT DOCUMENTS 5,739,495 A 4/1998 Marin et al.
5,828,026 A * 10/1998 Bruhl .................... H01H 33/76 218/150

(Continued)

FOREIGN PATENT DOCUMENTS

EP 3349234 A1 7/2018
JP 2021051945 A 4/2021

(Continued)

OTHER PUBLICATIONS

European Search Report for corresponding European Patent No. 21210316.2, mailed May 17, 2022, 5 pages.

*Primary Examiner* — William A Bolton
(74) *Attorney, Agent, or Firm* — Armstrong Teasdale LLP

(57) ABSTRACT

Provided herein is an electric arc-blast nozzle for a circuit breaker comprising a median part internally defining an axial electric arc cut-off passage and formed with a first dielectric material, first and second end parts formed with the first dielectric material and extending on either side of the median part and being intended to receive first and second arc contacts being axially moveable in relation to each other. The nozzle further comprises a sheath that is disposed on the external surface of the first end part and on a portion of the external surface of the neck-forming median part, said portion having the same radial external section than the first end part, is formed with a second dielectric material different from the first dielectric material and is obtained from a second composition comprising a thermoplastic polymer chosen from either a polysulfone or a polyetherimide, but not comprising fibrous reinforcements.

22 Claims, 1 Drawing Sheet

(58) Field of Classification Search
USPC ........................................ 218/62, 63, 53, 72
See application file for complete search history.

(56) References Cited

U.S. PATENT DOCUMENTS

| | | | | |
|---|---|---|---|---|
| 5,925,863 | A * | 7/1999 | Zehnder | H01H 33/7023 218/72 |
| 7,754,991 | B2 * | 7/2010 | Bessede | H01H 33/22 218/43 |
| 8,129,647 | B2 * | 3/2012 | Haberer | H01H 33/7069 218/72 |
| 8,304,676 | B2 * | 11/2012 | Uchii | H01H 33/56 218/85 |
| 9,704,679 | B2 * | 7/2017 | Nomura | H01H 33/7023 |
| 9,865,417 | B2 | 1/2018 | Zehnder et al. | |
| 10,236,146 | B2 * | 3/2019 | Vigouroux | H01H 33/901 |
| 10,373,785 | B2 * | 8/2019 | Kosse | H01H 33/22 |
| 10,692,673 | B2 * | 6/2020 | Ledru | H01H 33/91 |
| 2008/0083704 | A1 | 4/2008 | Ozil et al. | |
| 2017/0162349 | A1 * | 6/2017 | Girodet | H01H 33/74 |

FOREIGN PATENT DOCUMENTS

| | | | |
|---|---|---|---|
| KR | 20190110842 | A | 10/2019 |
| WO | 2018001798 | A1 | 1/2018 |

* cited by examiner

ELECTRIC ARC-BLAST NOZZLE WITH IMPROVED MECHANICAL STRENGTH AND A CIRCUIT BREAKER INCLUDING SUCH A NOZZLE

CROSS-REFERENCE TO RELATED APPLICATIONS

The present application claims the benefit of priority to European Patent Application No. 21210316.2, filed on Nov. 24, 2021, the contents of which are incorporated by reference in its entirety.

DESCRIPTION

Technical Field

The present invention relates to an electric arc-blast nozzle provided with an improved mechanical strength. This electric arc-blast nozzle is namely intended to be included in a high voltage circuit breaker, this voltage typically ranging between 1 kV and 800 kV.

The invention also relates to a circuit breaker, especially to a high voltage circuit breaker, including such an electric arc-blast nozzle.

Prior Art

An electric arc-blast circuit breaker has at least two arc contacts axially mobile in relation to each other, between a circuit breaker opening position in which the arc contacts are separated from each other and a circuit breaker closing position in which the arc contacts are in contact with each other, an electric arc-blast nozzle and an electric arc cut-off gas circulating in the nozzle to cut an electric arc that is likely to be formed during the movement of the arc contacts from the closing position to the opening position of the circuit breaker.

A conventional electric arc-blast nozzle consists of the following parts:

- a median neck-forming part internally defining an axial electric arc cut-off passage, and
- first and second end parts extending on either side of the median part which are respectively intended to receive the arc contacts that can be axially moved in relation to each other, between a circuit breaker opening position in which the arc contacts are separated from each other and a circuit breaker closing position in which the arc contacts are in contact with each other and in which one of the arc contacts partially closes the axial passage of the median part, an electric arc cut-off gas circulating in the axial passage of the median part to cut an electric arc that is likely to be formed during the movement of the arc contacts from the closing position to the opening position of the circuit breaker.

The median part and first and second end parts of the nozzle are formed with a dielectric material that is obtained from a composition comprising, or consisting of, a fluorocarbon polymer matrix, such as polytetrafluoroethylene (PTFE).

To cut an electric arc, an arc-blast circuit breaker uses a cut-off gas formed by an insulating dielectric gas. This cut-off gas is delivered from a blast chamber in the axial passage of the median part of an electric arc-blast nozzle as described above. The function of such a nozzle is to channel the electric arc and, in doing so, increase the pressure of the cut-off gas around the electric arc, thus encouraging its cut-off.

Currently, the cut-off gas most commonly used in this type of circuit breakers is sulfur hexafluoride $SF_6$ and this, because of its exceptional physical properties. However, $SF_6$ has the major disadvantage of being a very powerful greenhouse gas, with a particularly high global warning potential (GWP).

Among the alternatives to using $SF_6$ as cut-off gas with a very low GWP, carbon dioxide $CO_2$ is a particularly interesting electric arc cut-off gas due to its strong electric insulation and electric arc extinguishing ability. Furthermore, $CO_2$ is nontoxic, non-inflammable and also easy to procure.

$CO_2$ can be used alone or as the gas vector in a gaseous mixture, of which it constitutes the main gas. For example, the gaseous mixture may comprise dioxygen $O_2$ and/or a fluoronitrile compound in addition to $CO_2$.

Such a gaseous mixture may have the following composition, in mole percent (% mol) and relative to the whole composition:

- from 65% mol to 99% mol of $CO_2$, and
- up to 35% mol of $O_2$, and/or
- up to 30% mol of a fluoronitrile compound.

A particularly advantageous electric arc cut-off gaseous mixture, which comprises $CO_2$, $O_2$ and perfluoroisobutyronitrile (CAS No. 42532-60-5) as fluoronitrile compound, is the electrical insulation gaseous mixture sold by General Electric Company under the name $g^3$ (meaning "green gas for grid"), which has 98% less impact on GWP than $SF_6$.

More specifically, this $g^3$ gaseous mixture comprises, in mole percent (% mol) and relative to the whole gaseous mixture:

- from 70% mol to 97% mol of carbon dioxide $CO_2$,
- up to 20% mol of dioxygen $O_2$, and
- from 3% mol to 10% mol of perfluoroisobutyronitrile of formula $(CF_3)_2CF—CN$.

However, a greater pressure increase in the inner volume and through the PTFE parts of the nozzle is observed when alternative gases are used, instead of $SF_6$, as the cut-off gas. For example, measures with sensor have shown that pressures with alternative gases may reach values being up to 50% higher than those reached with $SF_6$ for a same design of electric arc-blast nozzle.

This pressure increase may provide at least a permanent radial deformation of the PTFE parts of the nozzle, or even their breakage, leading to the partial or total dysfunction of the circuit breaker equipped with such a nozzle.

In order to overcome these drawbacks arising with the use of alternative gases, different solutions were proposed to improve the reinforcement of the mechanical strength of the PTFE nozzles, namely by means of an additional part.

U.S. Pat. No. 5,739,495 A discloses a nozzle made of insulating material, especially PTFE, that bears on its outside a plastic tube made of fiber-reinforced plastic as additional part. This plastic tube does not have to consist of the same material as the nozzle made of since it does not come into contact with the electric arc and is also not intended to release any arc-extinguishing gas under the influence of the electric arc. Thus, a less expensive material can be chosen for the plastic tube that has only mechanical stabilization duties and can be built correspondingly small. The plastic tube only needs to be large enough to brace the PTFE nozzle in the areas of particularly low wall strength. Aramid fibers, fiberglass or plastic fibers can be provided as reinforcement fibers.

The use of a fiber-reinforced plastic material has some disadvantages, namely regarding the manufacturing process of such a materiel: particularly, the step of inserting fibers into the plastic matrix requires a careful control of the moisture content. Indeed, the presence of moisture embedded in the fiber-reinforced plastic material subjected to electric fields will lead to partial discharges and to the system failure. In addition, implementing a fiber-reinforced plastic material has necessarily a higher cost than a plastic material without fibrous reinforcements.

In KR 2019-01100842 A, the additional part consists in a nozzle support member that is inserted into the interior of the main nozzle. This nozzle support member is preferably formed in a pipe shape and is made of metal, such as steel.

In JP 2021-051945 A, this additional part is formed by a splittable connector adapter having a donut shape. This adapter, which is in aluminum, surrounds and is in contact with the outer circumference of the insulation nozzle.

For avoiding the use of metal additional parts that make the manufacture of nozzles more difficult, it is possible to increase the thickness of the PTFE parts forming the electric arc-blast nozzle. However, such thicknesses cannot increase indefinitely for economic and environmental reasons inherent in the increased weight and volume of the PTFE parts of the nozzle, noting that PTFE is known as a major contributor to the ozone destruction according to the Life Cyclic Assessment (LCA) criteria.

The purpose of the invention is thus to propose a new electric arc-blasting nozzle, which addresses the drawbacks of the electric arc-blasting nozzles of prior art.

In particular, this new nozzle must allow for equipping a circuit breaker working with any type of cut-off gas, in particular, and for obvious environmental reasons, with cut-off gases having a lower global warning potential than that of $SF_6$, especially with the $g^3$ gaseous mixture mentioned above but also with $SF_6$, $CO_2$ alone or with other gaseous mixtures comprising $CO_2$ as the vector gas.

This new nozzle must also make it possible to equip such a circuit breaker without any significant increase in its congestion and in the absence of any notable addition, while ensuring excellent cut-off performances of the electric arc, with such performances also falling in line with the duration.

SUMMARY OF THE INVENTION

These purposes mentioned above as well as others are achieved, firstly, with an electric arc-blast nozzle for a circuit breaker, this nozzle comprising:

- a neck-forming median part internally defining an axial electric arc cut-off passage and formed with a first dielectric material obtained from a first composition comprising a fluorocarbon polymer matrix,
- first and second end parts also formed with the first dielectric material and extending on either side of the median part which are respectively intended to receive first and second arc contacts, the first and second arc contacts being axially moveable in relation to each other, between a circuit breaker opening position in which the first and second arc contacts are separated from each other and a circuit breaker closing position in which the first and second arc contacts are in contact with each other and in which the second arc contact partially closes the axial passage of the median part, an electric arc cut-off gas circulating in the axial passage of the median part to cut an electric arc that is likely to be formed during the movement of the first and second arc contacts from the closing position to the opening position of the circuit breaker, and
- a sheath that is only disposed on the external surface of the first end part and on a portion of the external surface of the neck-forming median part, said portion having the same radial external section than the first end part, and that is formed with a second dielectric material being different from the first dielectric material and being obtained from a second composition comprising a polymer.

According to the invention, the polymer of the second composition is a thermoplastic polymer chosen from either a polysulfone (PSU) or a polyetherimide (PEI) and the second composition does not comprise fibrous reinforcements.

The absence of fibrous reinforcements and the choice of PSU or of PEI as thermoplastic polymer for the composition of the sheath together with the partial localization of said sheath in the area of the nozzle which is subject to the highest pressures make it possible to avoid a radial deformation of the nozzle and thus to reinforce the mechanical strength of the nozzle by means of an additional part that combines mechanical and dielectric properties with no risk of discharges due to the absence of moisture unlike what may be the case with the fiber-reinforced plastic tube disclosed in U.S. Pat. No. 5,739,495 A, while having a reduced environmental footprint compared to PTFE being manufactured at controlled costs.

In addition, PSU and PEI are thermoplastic polymers that are not degraded, either by the gas(es) forming the electric arc cut-off gas or by their decomposition by-products induced by arcing.

The tests carried out show that the electrical arc-blast nozzle according to the present invention does not break despite high pressures and that, with a global mass that is reduced in comparison with prior art nozzles provided with metal additional part.

As described above, the first and second end parts and neck-forming median part of the nozzle are formed with a first dielectric material obtained from a first composition comprising a fluorocarbon polymer matrix.

As part of this invention, the term "matrix" means that the fluorocarbon polymer constitutes the compound with the predominant percentage weight in the composition in question. This percentage weight is favorably at least 50% and preferably, at least 75%.

The fluorocarbon polymer of the first composition can be favorably chosen from the group consisting of polytetrafluoroethylene (PTFE), a copolymer of ethylene and tetrafluoroethylene (ETFE) and a polyfluoride of vinylidene (PVDF).

Preferably, this fluorocarbon polymer is polytetrafluoroethylene (PTFE).

This first composition from which the first dielectric material is obtained may be made up only of a fluorocarbon polymer and, therefore, does not comprise any inorganic filler.

But this first composition may also further comprise at least one inorganic filler in a percentage weight less than or equal to 10%, with respect to the total weight of the first composition.

According to a specific embodiment of the invention, the percentage weight of the inorganic filler(s) in the first composition ranges between 0.01% and 5% and, preferably, between 0.1% and 2%, with respect to the total weight of the first composition.

The at least one inorganic filler of the first composition may be chosen from the group consisting of:

a sulfur, preferably $MoS_2$, $Sb_2S_5$ or $Sb_2S_3$,
a ceramic, preferably BN,
an oxide chosen from among $SiO_2$, $TiO_2$, $Al_2CoO_4$, ZnO, $BaTiO_3$ and $P_2O_5$, preferably $SiO_2$ and $Al_2CoO_4$,
a graphite,
a mica,
a glass, and
a fluoride, preferably $CaF_2$.

According to an advantageous embodiment of the invention, the electric arc-blast nozzle of the present invention may further comprise an insert that defines a downstream area of the axial passage of the median part considering the direction of the flow of the electric arc cut-off gas and that is formed with a third dielectric material. This third dielectric material is different from the first dielectric material and is chosen from:

(i) a composite material obtained from a third composition comprising a fluorocarbon polymer matrix and:
  at least one inorganic filler A chosen from among a sulfur, preferably $MoS_2$, $Sb_2S_5$ or $Sb_2S_3$, a ceramic, preferably BN, and an oxide chosen from among $SiO_2$, $TiO_2$, $Al_2CoO_4$, ZnO, $BaTiO_3$ and $P_2O_5$, preferably $SiO_2$, in a percentage weight ranging between 0.1% and 10%, with respect to the total weight of the third composition, and/or
  at least one inorganic filler B chosen from among a graphite, a mica, a glass and a fluoride, preferably $CaF_2$, in a percentage weight ranging between 5% and 50%, with respect to the total weight of the third composition; and
(ii) a ceramic material obtained from a fourth composition comprising at least one compound chosen from among a carbide, a boride and an oxide.

The presence of such an insert that is formed with the third dielectric material as described above and that is located in a downstream area of the axial passage of the median part of the nozzle makes it possible to give the nozzle, in addition to the mechanical resistance mentioned above, a resistance to thermal erosion observed in the nozzles classically made of PTFE, by keeping the section of this axial passage invariable at the level of the downstream area of said insert and this, irrespective of the wear and tear of the first dielectric material, the number of cut-offs and/or the intensity of the short-circuit.

The presence of such an insert with its advantages has already been described in WO 2018/001798 A1.

Particularly, in a first embodiment noted (i), the third dielectric material that forms the insert can be a composite material obtained from a third composition comprising a fluorocarbon polymer matrix and at least one inorganic filler, with this or these inorganic filler(s) being selected both, from the point of view of their nature and their percentage weight with respect to the total weight of the third composition.

Like the fluorocarbon polymer of the first composition, the fluorocarbon polymer of this third composition can be favorably chosen from among PTFE, ETFE, PVDF and is preferably PTFE.

According to a first version, the third composition comprises at least one inorganic filler noted A, which is chosen from among:

a sulfur, such as $MoS_2$, $Sb_2S_5$ and $Sb_2S_3$,
a ceramic, such as BN and a $Bi_2O_3$—ZnO—$Nb_2O_3$, preferably BN,
an oxide chosen from among $SiO_2$, $TiO_2$, $Al_2CoO_4$, ZnO, $BaTiO_3$ and $P_2O_5$, preferably $SiO_2$.

The percentage weight of this or these inorganic fillers A ranges between 0.1% and 10%, advantageously between 0.2% and 5% and, preferably, between 0.5% and 3%, with respect to the total weight of the third composition.

According to a second version, the third composition comprises at least one inorganic filler noted B chosen from among a graphite, a mica, a glass and a fluoride, the fluoride being preferably $CaF_2$.

The percentage weight of this or these inorganic fillers B ranges between 5% and 50%, advantageously between 10% and 30% and, preferably, between 15% and 25%, with respect to the total weight of the third composition.

As described in WO 2018/001798 A1, the third composition, which makes it possible to obtain this third dielectric material, may comprise either only one inorganic filler A or B, or a mix of two, three or even more inorganic fillers A and/or B, it being specified that these mixes may only comprise inorganic fillers A or B. But these mixes may also comprise one or more inorganic fillers A and one or more inorganic fillers B.

In a second embodiment noted (ii), the third dielectric material that forms the insert can be a ceramic material obtained from a fourth composition comprising at least one compound chosen from among:

a carbide, such as SiC, ZrC and HfC,
a boride, such as $ZrB_2$ and $HfB_2$, and
an oxide, such as $SiO_2$ and $ZrO_2$.

As also described in WO 2018/001798 A1, the fourth composition may consist of either a single compound or a mix of two, three or even more of such compounds.

Other particular features regarding the insert, such as those relating to the third and fourth compositions from which the third dielectric material is obtained and/or to its different conformations, which are disclosed in WO 2018/001798 A1, are applicable to the nozzle of the present invention when provided with such an insert.

According to another advantageous embodiment, the electric arc-blast nozzle of the present invention does not include an insert as described above. In this embodiment, the electric arc-blast nozzle comprises a neck-forming median part and first and second end parts all being made of PTFE.

Secondly, the invention relates to a circuit breaker, and preferably a high voltage circuit breaker.

This circuit breaker comprises:

at least first and second arc contacts that can be axially moved in relation to each other, between a circuit breaker opening position in which the first and second arc contacts are separated from each other and a circuit breaker closing position in which the first and second arc contacts are in contact with each other,
an electric arc-blast nozzle, and
an electric arc cut-off gas circulating in the axial passage of the median part of the nozzle to cut an electric arc that is likely to be formed during the movement of the first and second arc contacts from the closing position to the opening position of the circuit breaker.

The electric arc-blast nozzle of such a circuit breaker is such as defined above, i.e. it comprises a sheath that is only disposed on the external surface of the first end part and on a portion of the external surface of the neck-forming median part, said portion having the same radial external section than the first end part, said sheath being formed with a second dielectric material being different from the first dielectric material and being obtained from a second composition comprising a polymer.

According to the invention, the polymer of the second composition is a thermoplastic polymer chosen from either a polysulfone (PSU) or a polyetherimide (PEI).

The favorable features described above for the electric arc-blast nozzle according to the invention can evidently be taken by themselves or in combination in relation with the circuit breaker according to the invention.

The presence of the particular sheath in the electric arc-blast nozzle makes it possible to obtain a notable improvement for reinforcing the mechanical strength of the nozzle and, therefore, a notable improvement in the mechanical and electrical performance of a circuit breaker according to the invention.

According to an embodiment of the invention, the electric arc cut-off gas implemented in the circuit breaker according to the invention consists of carbon dioxide $CO_2$ or sulfur hexafluoride $SF_6$ or is a gaseous mixture comprising mainly of $CO_2$.

For example, the gaseous mixture may comprise dioxygen $O_2$ and/or a fluoronitrile compound in addition to $CO_2$.

Such a gaseous mixture may have the following composition, in mole percent (% mol) and relative to the whole composition:

from 65% mol to 99% mol of $CO_2$, and up to 35% mol of $O_2$, and/or up to 30% mol of a fluoronitrile compound.

According to an advantageous embodiment of the invention, the gaseous mixture comprises $CO_2$, $O_2$ and perfluoroisobutyronitrile of formula $(CF_3)_2CF—CN$ as fluoronitrile compound.

According to a preferred embodiment of the invention, the gaseous mixture comprising $CO_2$, $O_2$ and $(CF_3)_2CF—CN$ has the following composition, in mole percent and relative to the whole gaseous mixture:

from 70% mol to 97% mol of $CO_2$, up to 20% mol of $O_2$, and from 3% mol to 10% mol of $(CF_3)_2CF—CN$.

As mentioned above, such a gaseous mixture is sold by General Electric Company under the name $g^3$.

Other advantages and characteristics of the invention will appear upon reading the detailed description that follows and that relates to two electric arc-blast nozzle structures according to the invention, one of them being provided with an insert.

This detailed description, which mainly refers to FIGS. 1 and 2 as appended, is given for illustration and does not, in any case, constitute a limitation of the purpose of the invention.

BRIEF DESCRIPTION OF THE DRAWINGS

It is stated that the elements shared in FIGS. 1 and 2 are identified by the same reference numbers.

DETAILED DESCRIPTION OF PARTICULAR EMBODIMENTS

Figure 1:
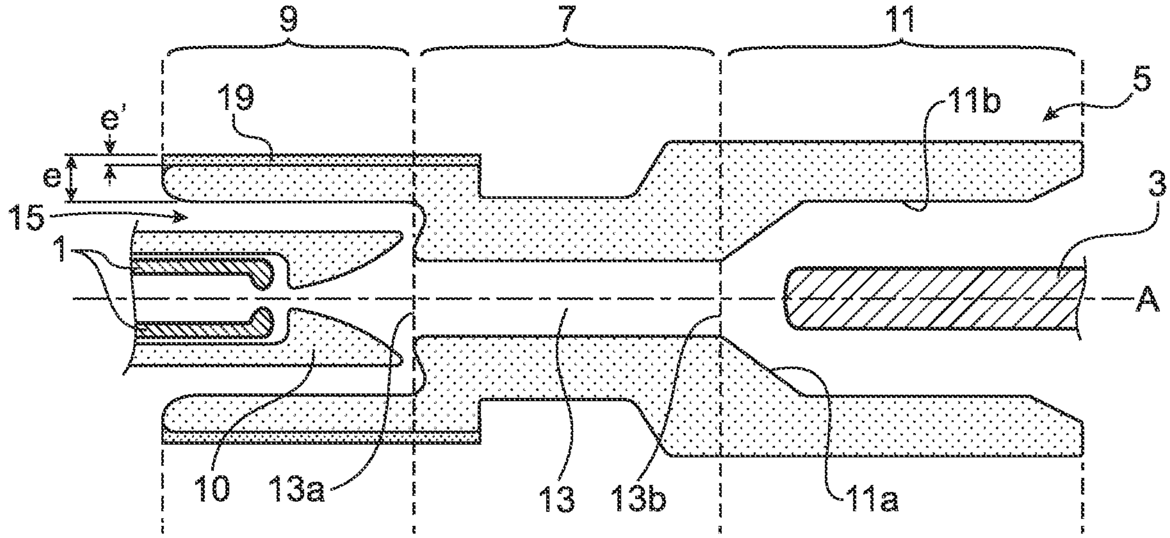
FIG. 1 is a fragmentary and diagrammatic view in longitudinal section of a circuit breaker including an electric arc-blast nozzle of the invention.

FIG. 1 shows a circuit breaker portion.

This circuit breaker includes:

at least two arc contacts 1 and 3 that are movable axially relative to each other, along an axis A, between an open position of the circuit breaker in which the arcing contacts 1 and 3 are separated from each other and a closed position of the circuit breaker in which the arcing contacts 1 and 3 are in contact with each other, and an electric arc-blast nozzle 5 according to the present invention.

This nozzle 5 comprises a neck-forming median part 7, a first end part 9 disposed upstream and a second end part 11 disposed downstream, the upstream and downstream disposition of the first and second end parts 9 and 11 being considered in the direction of the flow of the electric arc cut-off gas. These first and second end parts 9 and 11 extend on either side of the median part 7. These parts 7, 9 and 11 have a symmetrical revolution around axis A.

The median part 7 internally defines an axial passage 13 of the electric arc cut-off, this axial passage 13 comprising an inlet 13*a* and an outlet 13*b*. This median part 7 is called the neck-forming median part 7, due to the internal section of this axial passage 13, which is smaller than the internal section of each of the first and second end parts 9 and 11.

The first and second end parts 9 and 11 respectively receive and surround the arc contacts 1 and 3.

The first end part 9 disposed upstream channels the cut-off gas situated upstream and intended to blast the electric arc, whereas the second end part 11 disposed downstream evacuates and circulates the blast gas situated downstream, upstream and downstream being defined with reference to the direction of the flow of the electric arc cut-off gas.

The first end part 9 may have a cover 10 that surrounds arc contact 1.

In FIG. 1, the arc contacts 1 and 3 are separated from each other and therefore correspond to the opening position of the circuit breaker.

When the arc contacts 1 and 3 are in contact with each other, in the closing position of the circuit breaker, the arc contact 3 closes the axial passage 13 of the median part 7 partially.

There is an electric arc cut-off gas routing channel 15 between the arc contact 1 and the wall of the first end part 9, which allows the circulation of this gas in the axial passage 13 of the median part 7, from its inlet 13*a* to its outlet 13*b*, to cut an electric arc that is likely to be formed during the movement of arc contacts 1 and 3 from the closing position to the opening position of the circuit breaker.

The second end part 11 has a truncated cone shaped part 11*a* disposed in the extension of the median part 7 situated with respect to the outlet 13*b* of the axial passage 13, this truncated cone shaped part 11*a* being followed by a cylindrical part 11*b*.

The neck-forming median part 7 as well as the cover 10 and the first and second end parts 9 and 11 are made from a first dielectric material, which has good mechanical properties and thermal resistance. Typically, this first dielectric material is obtained from a first composition comprising a fluorocarbon polymer matrix, classically a PTFE matrix.

This first composition may comprise one or more inorganic fillers. When they are present, the inorganic fillers classically represent a percentage weight that may represent less than or equal to 10% of the total weight of the first composition, this percentage weight ranging advantageously between 0.01% and 5% and, preferably, between 0.1% and 2%, with respect to the total weight of the first composition.

Reference may be made to the summary of the invention for further details about the different inorganic fillers of this first composition suitable for being envisaged in order to obtain the first dielectric material constituting the cover 10, the middle part 7 and the first and second end parts 9 and 11 of the nozzle 5.

The electric arc-blast nozzle 5 further comprises a sheath 19 only disposed on the external surface of the first end part 9 and on a portion of the external surface of the neck-forming median part 7, said portion having the same radial external section than the first end part 9. The portion of the external surface of the neck-forming median part 7 is a portion that extends towards the first end part 9.

With regard to a nozzle comprising a sheath disposed on the external surfaces of the first end part 9, of the median part 7 and of the second end part 11, the localization of the sheath 19 only on the external surface of the first end part 9 and on a portion of the external surface of the neck-forming median part 7 has the advantage of avoiding a radial deformation of the nozzle part subject to the highest pressures while limiting material and process costs.

The sheath 19 is formed with a second dielectric material being different from the first dielectric material and being obtained from a second composition comprising a thermoplastic polymer that is chosen from either a polysulfone (PSU) or a polyetherimide (PEI), said second composition being devoid of fibrous reinforcements.

The second dielectric material obtained from such a thermoplastic polymer presents good mechanical properties and good high-temperature behavior.

In an advantageous embodiment, this second composition consists of PSU or PEI.

Such a sheath 19 can, for example, be produced by machining, molding or even by overmolding on the first end part 9 of the nozzle 5.

In one embodiment, the thickness, noted e', of the sheath 19 is between 5% and 90%, advantageously between 10% and 60% and, preferably, between 30% and 50% of the total thickness, noted e, of the first end part 9.

Since PSU and PEI have a lower density than PTFE, replacing part of the PTFE forming the first end part 9 with PSU and/or PEI reduces the overall mass of the electric arc-blast nozzle, thereby also reducing the operating energy of the circuit breaker provided with such an electric arc-blast nozzle, while promoting PTFE depletion.

In one embodiment, the length of the sheath 19 represents between 10% and 80% and, preferably, between 20% and 60% of the total length of the nozzle 5.

Figure 2:
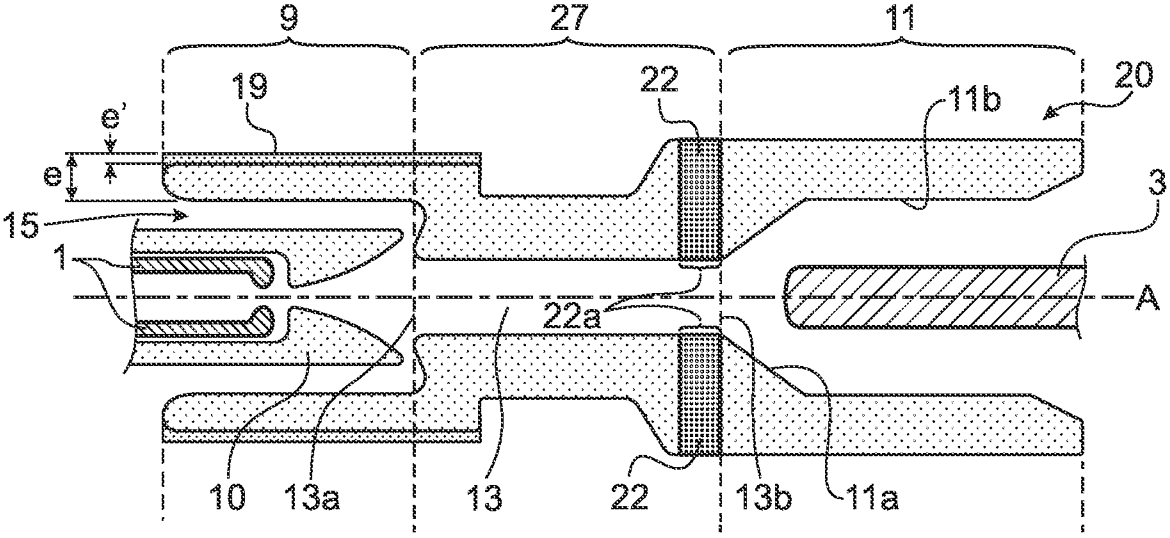
FIG. 2 is a fragmentary and diagrammatic view in longitudinal section of a circuit breaker including an electric arc-blast nozzle of the invention, the nozzle being further equipped with an insert.

Like FIG. 1, FIG. 2 shows a nozzle 20 of the invention, which is of the type shown in FIG. 1 and which further comprises an insert 22 defining a downstream area 22*a* of the axial passage 13 of the median part 7 considering the direction of the flow of the cut-off gas, direction that is established at the inlet 13*a* towards the outlet 13*b* of the axial passage 13, which is in the form of a ring.

The insert 22 of the nozzle 20 according to the invention is formed with a second dielectric material, separate from the first dielectric material forming the median part 7 (insert 22 not included) and the first and second end parts 9 and 11.

In FIG. 2, the insert 22 is in a form of a ring but nothing prevents the consideration of other conformations for this insert, in particular the conformations shown in FIGS. 2 and 4 to 7 of WO 2018/001798 A1.

The insert 22 is made from a third dielectric material that provides an excellent resistance to radiation from the electric arc. Typically, this third dielectric material is obtained is chosen from:

(i) a composite material obtained from a third composition comprising a fluorocarbon polymer matrix and:
  - at least one inorganic filler A chosen from among a sulfur, a ceramic and an oxide chosen from among $SiO_2$, $TiO_2$, $Al_2CoO_4$, ZnO, $BaTiO_3$ and $P_2O_5$, in a percentage weight ranging between 0.1% and 10%, with respect to the total weight of the third composition, and/or
  - at least one inorganic filler B chosen from among a graphite, a mica, a glass and a fluoride, in a percentage weight ranging between 5% and 50%, with respect to the total weight of the third composition, and (ii) a ceramic material obtained from a fourth composition comprising at least one compound chosen from among a carbide, a boride and an oxide.

Reference may be made to the summary of the invention for further details about the different variants of the third and fourth compositions that are likely to be possible for obtaining these composite and ceramic materials constituting the third dielectric material suitable for the insert 22.

The invention claimed is:

1. An electric arc-blast nozzle for a circuit breaker comprising:
- a neck-forming median part internally defining an axial electric arc cut-off passage and formed with a first dielectric material obtained from a first composition comprising a fluorocarbon polymer matrix,
- first and second end parts also formed with the first dielectric material and extending on either side of the median part which are respectively intended to receive first and second arc contacts, the first and second arc contacts being axially moveable in relation to each other, between a circuit breaker opening position in which the first and second arc contacts are separated from each other and a circuit breaker closing position in which the first and second arc contacts are in contact with each other and in which the second arc contact partially closes the axial passage of the median part, an electric arc cut-off gas circulating in the axial passage of the median part to cut an electric arc that is likely to be formed during movement of the first and second arc contacts from the closing position to the opening position of the circuit breaker, and
- a sheath that is only disposed on an external surface of the first end part and on a portion of an external surface of the neck-forming median part, said portion having a same radial external section as the first end part, and that is formed with a second dielectric material being different from the first dielectric material and being obtained from a second composition comprising a polymer, characterized in that the polymer of the second composition is a thermoplastic polymer chosen from either a polysulfone (PSU) or a polyetherimide (PEI) and in that the second composition does not comprise fibrous reinforcements.

2. The electric arc-blast nozzle according to claim 1, wherein the fluorocarbon polymer of the first composition is chosen from the group consisting of polytetrafluoroethylene (PTFE), a copolymer of ethylene and tetrafluoroethylene (ETFE) and a polyfluoride of vinylidene (PVDF).

3. The electric arc-blast nozzle according to claim 2, wherein the first composition further comprises at least one inorganic filler in percentage weight of less than or equal to 10 with respect to a total weight of the first composition.

4. The electric arc-blast nozzle according to claim 2, wherein the first composition does not comprise inorganic filler.

5. The electric arc-blast nozzle according to claim 2, wherein a thickness e' of the sheath is between 5% and 80% of a total thickness e of the first end part.

6. The electric arc-blast nozzle according to claim 2, further comprising an insert that defines a downstream area of the axial passage of the median part considering a direction of a flow of the electric arc cut-off gas and is formed with a third dielectric material, the third dielectric material being different from the first dielectric material and chosen from:

(i) a composite material obtained from a third composition comprising a fluorocarbon polymer matrix and:
at least one inorganic filler A chosen from among a sulfur, a ceramic, and an oxide chosen from among $SiO_2$, $TiO_2$, $Al_2CoO_4$, ZnO, $BaTiO_3$ and $P_2O_5$, and/or
at least one inorganic filler B chosen from among a graphite, a mica, a glass and a fluoride; and
(ii) a ceramic material obtained from a fourth composition comprising at least one compound chosen from among a carbide, a boride and an oxide.

7. The electric arc-blast nozzle according to claim 1, wherein the first composition further comprises at least one inorganic filler in percentage weight of less than or equal to 10 with respect to a total weight of the first composition.

8. The electric arc-blast nozzle according to claim 7, wherein the at least one inorganic filler is chosen from the group consisting of:
a sulfur,
a ceramic,
an oxide chosen from among $SiO_2$, $TiO_2$, $Al_2CoO_4$, ZnO, $BaTiO_3$ and $P_2O_5$,
a graphite,
a mica,
a glass, and
a fluoride.

9. The electric arc-blast nozzle according to claim 8, wherein a thickness e' of the sheath is between 5% and 80% of a total thickness e of the first end part.

10. The electric arc-blast nozzle according to claim 8, further comprising an insert that defines a downstream area of the axial passage of the median part considering a direction of a flow of the electric arc cut-off gas and is formed with a third dielectric material, the third dielectric material being different from the first dielectric material and chosen from:

(i) a composite material obtained from a third composition comprising a fluorocarbon polymer matrix and:
at least one inorganic filler A chosen from among a sulfur, a ceramic, and an oxide chosen from among $SiO_2$, $TiO_2$, $Al_2CoO_4$, ZnO, $BaTiO_3$ and $P_2O_5$, and/or
at least one inorganic filler B chosen from among a graphite, a mica, a glass and a fluoride; and
(ii) a ceramic material obtained from a fourth composition comprising at least one compound chosen from among a carbide, a boride and an oxide.

11. The electric arc-blast nozzle according to claim 7, wherein a thickness e' of the sheath is between 5% and 80% of a total thickness e of the first end part.

12. The electric arc-blast nozzle according to claim 7, further comprising an insert that defines a downstream area of the axial passage of the median part considering a direction of a flow of the electric arc cut-off gas and is formed with a third dielectric material, the third dielectric material being different from the first dielectric material and chosen from:

(i) a composite material obtained from a third composition comprising a fluorocarbon polymer matrix and:
at least one inorganic filler A chosen from among a sulfur, a ceramic, and an oxide chosen from among $SiO_2$, $TiO_2$, $Al_2CoO_4$, ZnO, $BaTiO_3$ and $P_2O_5$, and/or
at least one inorganic filler B chosen from among a graphite, a mica, a glass and a fluoride; and
(ii) a ceramic material obtained from a fourth composition comprising at least one compound chosen from among a carbide, a boride and an oxide.

13. An electric arc-blast nozzle according to claim 1, wherein the first composition does not comprise inorganic filler.

14. The electric arc-blast nozzle according to claim 13, wherein a thickness e' of the sheath is between 5% and 80% of a total thickness e of the first end part.

15. The electric arc-blast nozzle according to claim 13, further comprising an insert that defines a downstream area of the axial passage of the median part considering a direction of a flow of the electric arc cut-off gas and is formed with a third dielectric material, the third dielectric material being different from the first dielectric material and chosen from:

(i) a composite material obtained from a third composition comprising a fluorocarbon polymer matrix and:
at least one inorganic filler A chosen from among a sulfur, a ceramic, and an oxide chosen from among $SiO_2$, $TiO_2$, $Al_2CoO_4$, ZnO, $BaTiO_3$ and $P_2O_5$, and/or
at least one inorganic filler B chosen from among a graphite, a mica, a glass and a fluoride; and
(ii) a ceramic material obtained from a fourth composition comprising at least one compound chosen from among a carbide, a boride and an oxide.

16. The electric arc-blast nozzle according to claim 1, wherein a thickness e' of the sheath is between 5% and 80% of a total thickness e of the first end part.

17. The electric arc-blast nozzle according to claim 16, further comprising an insert that defines a downstream area of the axial passage of the median part considering a direction of a flow of the electric arc cut-off gas and is formed with a third dielectric material, the third dielectric material being different from the first dielectric material and chosen from:

(i) a composite material obtained from a third composition comprising a fluorocarbon polymer matrix and:
at least one inorganic filler A chosen from among a sulfur, a ceramic, and an oxide chosen from among $SiO_2$, $TiO_2$, $Al_2CoO_4$, ZnO, $BaTiO_3$ and $P_2O_5$, and/or
at least one inorganic filler B chosen from among a graphite, a mica, a glass and a fluoride; and
(ii) a ceramic material obtained from a fourth composition comprising at least one compound chosen from among a carbide, a boride and an oxide.

18. The electric arc-blast nozzle according to claim 1, further comprising an insert that defines a downstream area of the axial passage of the median part considering a direction of a flow of the electric arc cut-off gas and is formed with a third dielectric material, the third dielectric material being different from the first dielectric material and chosen from:

(i) a composite material obtained from a third composition comprising a fluorocarbon polymer matrix and:

at least one inorganic filler A chosen from among a sulfur, a ceramic, and an oxide chosen from among $SiO_2$, $TiO_2$, $Al_2CoO_4$, ZnO, $BaTiO_3$ and $P_2O_5$, and/or at least one inorganic filler B chosen from among a graphite, a mica, a glass and a fluoride; and (ii) a ceramic material obtained from a fourth composition comprising at least one compound chosen from among a carbide, a boride and an oxide.

19. A circuit breaker comprising the electric arc-blast nozzle according to claim 1.

20. The circuit breaker according to claim 19, wherein the electric arc cutoff gas consists of carbon dioxide $CO_2$ or sulfur hexafluoride $SF_6$ or is a gaseous mixture comprising mainly of $CO_2$.

21. The circuit breaker according to claim 20, wherein the gaseous mixture has the following composition, in mole percent and relative to a whole composition:

from 65% mol to 99% mol of $CO_2$, and
up to 35% mol of $O_2$, and/or
up 30% mol of a fluoronitrile compound.

22. The circuit breaker according to claim 21, wherein the gaseous mixture has the following composition, in mole percent and relative to the whole composition:

from 65% mol to 97% mol of $CO_2$,
up to 35% mol of $O_2$, and/or
from 3% mol to 30% mol of $(CF_3)_2CF$—CN.

* * * * *